US010926495B2

(12) United States Patent
Spindler et al.

(10) Patent No.: US 10,926,495 B2
(45) Date of Patent: Feb. 23, 2021

(54) METHOD AND APPARATUS FOR APPLYING A MEANS FOR SEALING AN INFLATABLE ARTICLE

(71) Applicant: Illinois Tool Works Inc., Glenview, IL (US)

(72) Inventors: Martin Spindler, Herdwangen (DE); Henry Klemm, Uberlingen (DE)

(73) Assignee: ILLINOIS TOOL WORKS, Glenview, IL (US)

( * ) Notice: Subject to any disclaimer, the term of this patent is extended or adjusted under 35 U.S.C. 154(b) by 0 days.

(21) Appl. No.: 15/776,947

(22) PCT Filed: Nov. 18, 2016

(86) PCT No.: PCT/IB2016/056984
§ 371 (c)(1),
(2) Date: May 17, 2018

(87) PCT Pub. No.: WO2017/085695
PCT Pub. Date: May 26, 2017

(65) Prior Publication Data
US 2018/0333927 A1    Nov. 22, 2018

(30) Foreign Application Priority Data
Nov. 18, 2015  (DE) ...................... 10 2015 119 917.3

(51) Int. Cl.
    B29C 73/16    (2006.01)
    B29C 73/02    (2006.01)
    B29L 30/00    (2006.01)
(52) U.S. Cl.
    CPC .......... *B29C 73/166* (2013.01); *B29C 73/025* (2013.01); *B29L 2030/00* (2013.01)

(58) Field of Classification Search
CPC .. B29C 73/166; B29C 73/025; B29L 2030/00
(Continued)

(56) References Cited

U.S. PATENT DOCUMENTS 3,718,238 A * 2/1973 Hazard ................ B65D 47/305
                                                    222/536
3,786,964 A * 1/1974 Landen ................ B65D 47/305
                                                    222/153.14
(Continued)

FOREIGN PATENT DOCUMENTS

CN     102120440 A    7/2011
CN     102673533 A    9/2012
(Continued)

OTHER PUBLICATIONS

International Search Report dated Feb. 22, 2017 for International Application No. PCT/IB2016/056984 filed Nov. 18, 2016.
(Continued)

*Primary Examiner* — Timothy L Maust
*Assistant Examiner* — James R Hakomaki
(74) *Attorney, Agent, or Firm* — Blue Filament Law PLLC (57) ABSTRACT

A device and method for dispensing and sealing an inflatable article, in particular a tire, are provide from a container (5) having a valve (6) that has an inlet (7) and an outlet (8), the inlet (7) and an outlet (8) are connected to one another in a first position of the valve (6) and are connected to one another in a first position of the valve (6), and outlet (8), the container (5) are in communication via the valve (6) only if necessary for delivering sealing means in the second position of the valve (6).

13 Claims, 5 Drawing Sheets

(58) Field of Classification Search
USPC .......................................................... 141/38
See application file for complete search history.

(56) References Cited

U.S. PATENT DOCUMENTS

| | | | | | |
|---|---|---|---|---|---|
| 4,081,113 | A | * | 3/1978 | Hazard | ................ B65D 47/305 222/534 |
| 5,156,853 | A | * | 10/1992 | Werner | ................ B29C 73/025 156/285 |
| 5,381,836 | A | * | 1/1995 | Braatz | ................ A61M 16/183 141/21 |
| 5,427,145 | A | * | 6/1995 | Grabenkort | ......... A61M 16/183 128/203.12 |
| 5,687,777 | A | * | 11/1997 | Dobson | ............... A61M 16/183 141/18 |
| 7,886,783 | B2 | * | 2/2011 | Rindy | ................ A61M 16/183 141/302 |
| 8,459,150 | B2 | * | 6/2013 | Yoshida | ................ B29C 73/166 141/192 |
| 8,596,310 | B2 | * | 12/2013 | Senno | ................... B29C 73/166 141/38 |
| 9,168,798 | B2 | * | 10/2015 | Eckhardt | ............... B29C 73/166 |
| 9,868,420 | B2 | * | 1/2018 | Chou | ..................... F04B 35/04 |
| 2010/0108186 | A1 | * | 5/2010 | Yoshida | ................. B60S 5/043 141/38 |
| 2011/0155280 | A1 | | 6/2011 | Eckhardt | |
| 2011/0192492 | A1 | * | 8/2011 | Kanenari | ............... B29C 73/166 141/38 |
| 2014/0209207 | A1 | | 7/2014 | Spindler et al. | |
| 2014/0209208 | A1 | * | 7/2014 | Taniguchi | ............... B29C 73/166 141/38 |
| 2015/0059921 | A1 | * | 3/2015 | Jhou | ..................... B29C 73/166 141/38 |
| 2016/0271892 | A1 | * | 9/2016 | Eckhardt | ............... B29C 73/166 |
| 2016/0288434 | A1 | * | 10/2016 | Eckhardt | ............... B60C 29/064 |
| 2017/0173900 | A1 | * | 6/2017 | Kawatani | ............... B29C 73/166 |

FOREIGN PATENT DOCUMENTS

| | | |
|---|---|---|
| CN | 203752543 U | 8/2014 |
| CN | 204278561 U | 4/2015 |
| DE | 10106468 A1 | 8/2002 |
| DE | 202005021981 U1 | 3/2012 |
| DE | 10106468 B4 | 11/2012 |
| EP | 2792473 A1 | 10/2014 |
| WO | 2009065653 A1 | 5/2019 |

OTHER PUBLICATIONS

Chinese first office action (Original and Translated copies) dated Nov. 5, 2019 in Chinese Application No. 201680066598.1.
Chinese search report dated Oct. 27, 2019 in Chinese Application No. 201680066598.1.

* cited by examiner

METHOD AND APPARATUS FOR APPLYING A MEANS FOR SEALING AN INFLATABLE ARTICLE

FIELD OF THE INVENTION

The invention relates to a method for dispensing a device for sealing an inflatable article, in particular a tire, from a container containing a valve, which has an inlet and an outlet, a compressed air source is connected to the inlet and a connecting line for connection to the inflatable article connected is to the outlet in a first position of the valve inlet and outlet, a second position of the valve communication is produced between the inlet and the container as well as the container and the outlet.

BACKGROUND OF THE INVENTION

Such devices and methods are known in various forms and designs. For example, if a tire of a car leaks and loses air, then the option exists of changing the tire or a set of tires. A tire change is exhausting and heavy and above all, a spare tire in the trunk occupies considerable space. In addition, there is extra fuel consumption is due to the additional weight of the spare tire together with the rim.

Tire repair kits can either be used only to inflate a tire or to seal and then inflate a tire. Depending on whether the tire is merely to be inflated or both sealed and inflated, a user is either connected to a container by means of a hose with, for example, a compressor. Also, the container may be omitted and only one hose may be connected to the compressor.

Depending on the connection configuration, either a direct air flow from the compressor into the hose takes place without a diversion through the container or an air supply into the container takes place, which entails an admixture of sealing medium from the container into the hose.

In the case of a direct air flow, compressed air without sealing means emerges from the outlet end of the hose so that the device can also be used in the corresponding connection configuration for the pure inflation of a tire which is intact.

When the air stream delivered by the compressor is diverted through the container, a sealing means is pushed out of the container into the hose. Therefore, the device in this communicative gas configuration can be used for sealing and subsequent inflation of a defective tire.

DE 20 2005 021981U1 describes a kit for inflating and repairing inflatable articles, and in particular vehicle tires, the kit includes a compressor assembly, a container with a sealing liquid, and a connecting device for connecting the container to the compressor assembly and an inflatable article to achieve article repair and inflation. The finishing kit also includes an outer housing which houses the compressor assembly and which defines a placement for the container of the sealing liquid. The container is removable from the placement. By providing the connecting means for stably connecting the container to the compressor assembly, it is noted that when the container is taken from the placement, the container remains functionally connected to the compressor assembly.

In DE 101 06 468 A1, the removal element has at least one valve which switches between different positions. The first position is a complete closure of inlet and outlet to the container. In a second position, connecting ducts and ducts to the container interior are opened to expose tire sealing means. A further position allows direct connection through from the inlet to the outlet without air passing through the container. In the switched-on position, which is realized by way of a bypass, air can, for example, be passed directly for the inflation of a tire. This also serves to clean the connecting hose.

In order to eliminate the opening of the container for the removal of tire sealant, a film is provided on the container, in particular a sealing film that can be opened or opened at high pressure via the inlet or outlet. As a result, only the valve needs to be switched to open in order to introduce the air from the air source via the supply line through the inlet into the container. The tire sealant flows from the container into the tire via the connecting duct and outlet via the connecting tube. After the tire sealant has been applied, for example, further inflation of the tire can be ensured by closing the valve and the bypass connecting the inlet to the outlet. At the same time, it is ensured that no further tire sealant can be released. In addition, tire sealant remaining in the connecting duct is purged.

When the device is inserted into a housing, the valve which can be easily operated from the outside by means of switching elements, shift levers, rotary switches or the like. Only the switching element has to be transferred in order, for example, to inject the tire sealant into the tire.

OBJECT OF THE INVENTION

The object of the present invention is to simplify the handling of a device according to the invention and to provide a simplified manufacture thereof.

Solution of the Object

In order to achieve this object, the container valve is only retained, if necessary, by sealant in, or on a receptacle of the valve.

This means that the container with the sealant is not contacted when, for example, only air is to be conveyed into the inflatable article, such as a tire. The great advantage of this is that the sealant in the container has greater storage stability. For when it is not needed, the sealant is not opened and thus air and/or impurities do not enter the container.

The valve is always in a first setting or position in its default position or without a mounted container and is preferably brought into a second setting or position only by the container. Again, the aspect of simple and safe handling is afforded to the present invention.

In addition, in this position of the valve, the inlet and the outlet are connected for direct passage of air. When sealant is used, the container is placed on the valve and is in a horizontal position. The container and the valve are connected via a clip connector, so that the container is securely seated in its placement. A positioning device for the container is also provided. Thus, the user cannot improperly operate the inventive device.

By rotating the container together with a part of the valve, the latter is brought into the second setting or position. In this second position, a connection is established between the inlet and the container as well as the container and the outlet, the container being upside down in this position. This greatly simplifies handling of the entire tire repair kit and leaves no room for error.

A further great advantage of the present invention is also that the valve and container are kept separate from each other in the housing. This ensures that the valve is not suddenly activated and the sealant runs out of the container.

Both, both the valve and the container, are protected in the housing, each with a separate cover. This way, the container cannot fall out of the housing or impurities clog the valve.

Above, the clip connector has already been discussed that ensures a secure placement of the container. In addition, a separate attachment is provided to the container for the retention of the clip connector, which provides the great advantage that only the container and/or the receptacle have to be exchanged and not the entire tire repair kit thereby creating an enormous cost saving.

The valve has a shaft about which a switching element is rotatably mounted relative to the container receptacle for achieving the two positions of the valve, which means that the valve can be activated by this rotation and only then convey sealant to an inflatable article. A simplified operation of the present invention results.

The shaft is located in the housing and is traversed at least by one axial bore which is suitable in the first position of the valve for the passage of air, if necessary also via a bypass channel. In the second position of the valve, an axial bore is provided for passing air into the container and a second axial bore is provided for passing sealant out of the container.

All channels and lines are compactly accommodated in this one shaft and the switching element achieves a space-saving. Free hoses or the like are not provided, but the user merely has to change the position of the container and the tire repair kit operates properly.

In the second position of the valve, when the container is perpendicular to the head, the valve is fixed in the preferred embodiment via a clip connector. As a result, the container does not inadvertently tilt back into its first, horizontal position and thus stops the sealing process at an early stage.

The connecting duct between the valve and the tire passes into the housing a through an additional clip connector. Thus, it is ensured that the duct can not be readily occluded and that a safe transport of air, or air and sealant to the tire can occur.

Figure 1:
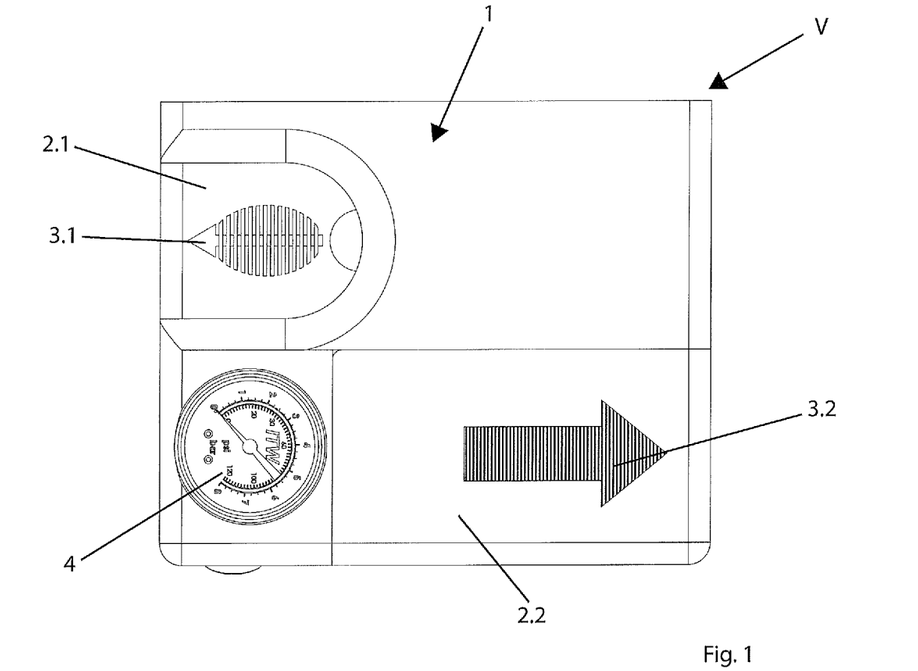
FIG. 1 is a perspective view of a device for dispensing a means for sealing an inflatable article, the device having a housing on which two removable covers are arranged in accordance with embodiments of the invention.

According to FIG. 1, the present device V for dispensing a means for sealing an inflatable article includes a housing 1 on which two removable covers 2.1 and 2.2 are arranged, which can be removed according to the direction of the arrows 3.1 and 3.2.

Furthermore, a manometer 4 is shown on the housing which indicates the pressure in the inflatable article, but is not further described here, since the present invention does not describe in detail conventional components.

Figure 2:
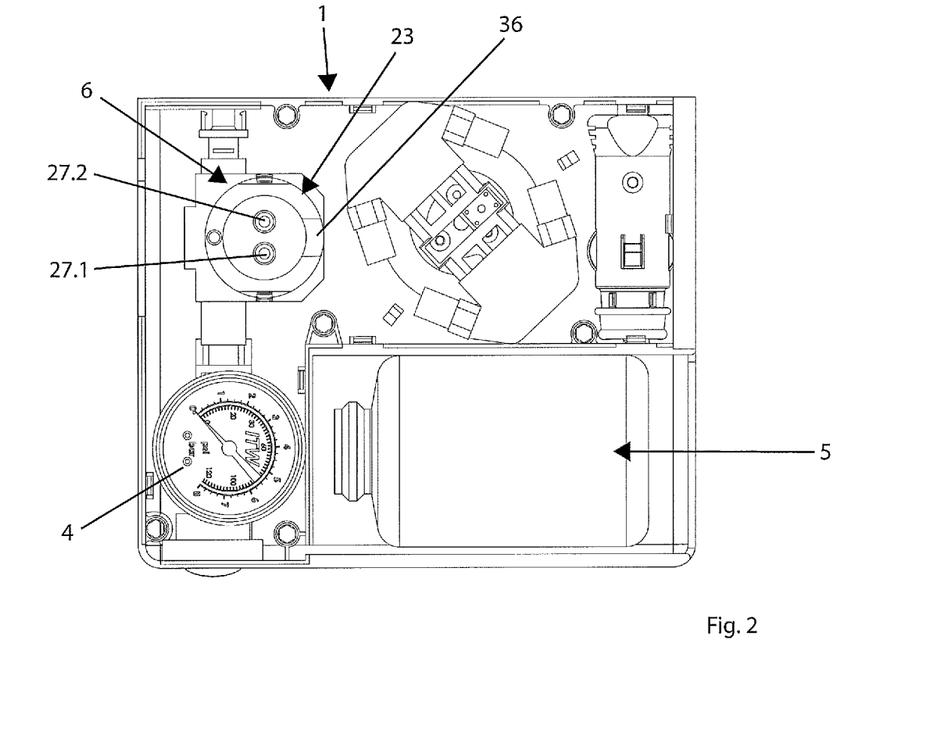
FIG. 2 is a perspective view illustrating the interior of a housing of an inventive device in accordance with embodiments of the invention.

FIG. 2 shows the interior of the housing 1. A container 5, which is filled with sealant, is located under the cover 2.2 in the closed state of the housing 1, and a valve 6, which is located in the closed state of the housing 1 under cover 2.1. A compressor for compressed air and a connection to an on-board network of a passenger car are not described.

According to FIGS. 3-9, the valve 6 has an inlet 7 and an outlet 8. A compressed air source, in particular a compressor, which is not further described, is connected to the inlet 7, and a hose 9 or a corresponding connecting duct for connection to the inflatable article is connected to the outlet 8.

Figure 3:
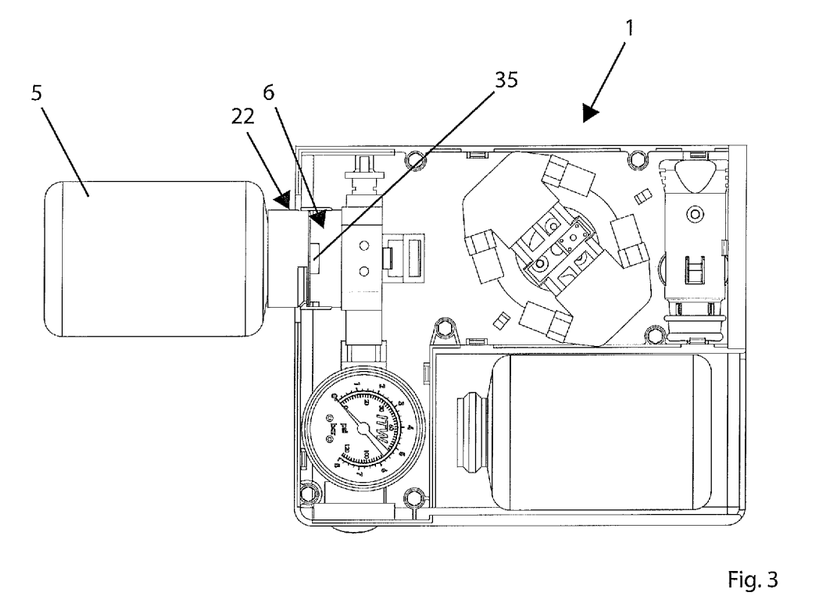
FIG. 3 is a perspective view illustrating an inventive device in a position of use which is referred to as a first position with a container fastened thereon in a horizontal position in accordance with embodiments of the invention.

FIG. 3 shows the device according to the invention in a position of use which is referred to as a first position. For this purpose, the valve 6 is tilted in the housing 1 after removal of the cover 2.1, and the container 5 is fastened thereon in a horizontal position. In this first position, only compressed air is supplied from the inlet 7 to the outlet 8.

Figure 4:
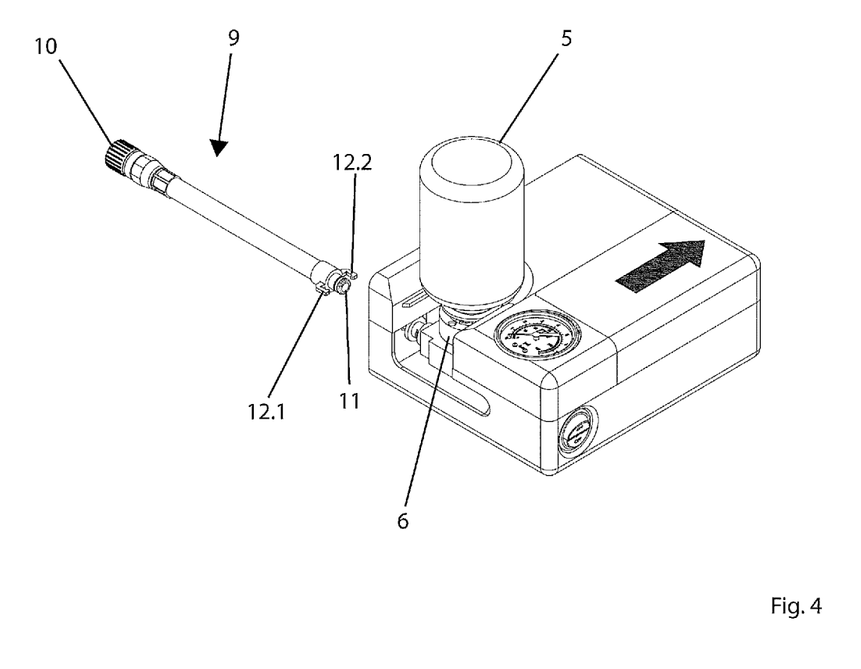
FIG. 4 is a perspective view illustrating an inventive device in a position of use which is referred to as a second position with a container being perpendicular to the head in accordance with embodiments of the invention.

According to FIG. 4, the container 5 is brought into a second position in which the container 5 is perpendicular to the head so that the sealant located therein runs downwards. In this second position, compressed air sealant is fed through the hose 9 into a valve (not shown) of the inflatable article.

Figure 10:
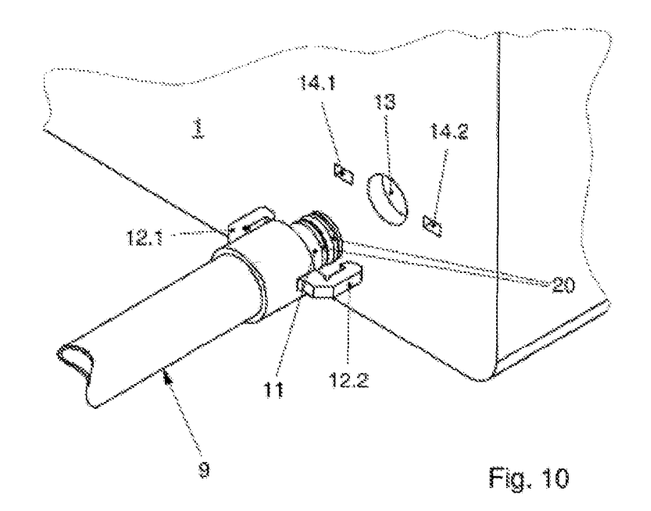
FIG. 10 is an exploded view illustrating a hose to be inserted laterally into an opening in a housing of an inventive device in accordance with embodiments of the invention.

According to FIGS. 4 and 10, the hose 9 has a rotary sleeve 10 at a one end thereof for screwing on the valve. The other end shows a nipple 11 and clip connectors 12.1 and 12.2.

The nipple 11 of the hose 9 is inserted laterally into an opening 13 in the housing 1. The clip connectors 12.1 and 12.2 secure the hose 9 by being clipped in slots 14.1 and 14.2, which are located next to the opening 13.

For connection to the valve 6, a connecting head 22, in particular also shown in FIG. 3, is first screwed onto the container 5, the latter having a corresponding internal thread, which is screwed onto an external thread 21 of the container. This connecting head 22 is inserted into a receptacle 23 of the valve, the receptacle 23 having a channel 16 in which a shaft 24 is located. The receptacle 23 rotates about this shaft 24 which is arranged in the housing 1 in a stationary manner. The inlet 7 and the outlet 8 are provided at one end of the shaft 24, respectively.

For rotating the shaft 24, two bearing blocks 26.1 and 26.2 protrude from a bottom 25 of the housing 1.

In the receptacle 23 two rising connection heads 27.1 and 27.2 are provided according to FIG. 2, on which two sleeve sections 28.1 and 28.2 of the connecting head 22 can be placed. In this way, two ducts 29.1 and 29.2 in the receptacle 23 are connected to the interior of the container 5. These ducts 29.1 and 29.2 open out into an opening 30.1 or 30.2 (see FIG. 7) into a transverse channel 31.1 or 31.2 in the receptacle 23, respectively. These transverse channels are both closed at one end by corresponding plugs 32.1 and 32.2, respectively.

The shaft 24 has axial bores 17.1 and 17.2 respectively, which are separated from one another by an intermediate piece 33, from the inlet 7 and the outlet 8. A transverse bore 18.1 according to FIG. 7 branches off from the axial bore 17.1 and leads to a bypass channel 34 in the receptacle 23, which bridges the two axial bores 17.1 and 17.2. This bypass channel 34 then again has a transition to a further transverse bore 18.2, which opens into the axial bore 17.2.

A further transverse bore 19.1 is provided at the end of the axial bore 17.1, radially offset from the transverse bore 18.1, which opens into the transverse channel 31.1 in the second position of the valve 6 according to FIG. The axial bore 17.1 is then connected to the interior of the container 5 through the opening 30.1 and the channel 29.1 as well as the sleeve section 28.1. Likewise, the axial bore 17.2 has, at its inner end, a further transverse bore 19.2 which is arranged offset with respect to the transverse bore 18.2 in the shaft 24. The transverse bore 19.2 is connected to the transverse channel 31.2. Via the opening 30.2, this channel then has a connection into the interior of the container 5 via the channel 29.2 and the sleeve section 28.2.

The operation of the invention is as follows:
The compressed air source, the container 5 and the valve 6 are located in the housing 1. The housing 1 can likewise be inserted, for example, into the trunk of a vehicle.
If the sealant is used as a result of a tire deflation from the container 5, the covers 2.1 and 2.2 are removed from the housing 1 and the container 5 is removed from the housing 1.
Optionally, an existing sealing film is removed from the container 5.
The connecting head 22 is then screwed onto the container 5. This connecting head 22 has a centering lug 35 (see FIG. 3) which ensures a correct desired placement of the connecting head 22 on the receptacle 23 so that the sleeve sections 28.1 and 28.2 also find the respective connecting heads 27.1 and 27.2. For this purpose, an edge of the receptacle 23 has a cut-out 36.
Furthermore, two clip hooks 37 protrude from the receptacle 23 on both sides, only one of which is shown in FIG. When the connecting head 22 is placed on the receptacle 23, these clip hooks 37 are latched into corresponding grooves formed laterally in the receptacle 23. This results in a good connection between the container 5 and the valve 6.
If, in a first position shown in FIG. 3, only the introduction of compressed air into an inflatable article is desired, then the valve, composed of the receptacle 23 and the shaft 24, is located in the position shown in FIG. 7. Compressed air is introduced, for example, through the inlet 7 by means of a compressor, which is also position within the housing 1. The compressed air reaches the outlet 8, which is connected to the hose 9, via the transverse bore 18.1, the bypass channel 34, the transverse bore 18.2 and the axial bore 17.2.

However, if sealant is to be introduced from the container 5 into the inflatable article, the bottle is turned vertical by 90°, as shown in FIG. 4. In this case, the receptacle 23 rotates about the shaft 24 and reaches the position shown in FIG. 8. In this case, the transverse holes 18.1 and 18.2 are closed to the bypass channel 34, but a connection is made between the transverse channel 31.1 and the axial bore 17.1 via the transverse bore 19.1 and also a connection between the transverse channel 31.2 and the axial bore 17.2 via the transverse bore 19.2. Thus, air enters the interior of the container 5 via the inlet 7, the axial bore 17.1, the transverse bore 19.1, the transverse channel 31.1, the opening 30.1, the channel 29.2, the connecting head 27.1, the sleeve section 28.1 and the bores accordingly integrated in these two elements and there pressurizes the sealant. The sealant is now conveyed to the outlet 8 via the sleeve section 28.2, the connecting head 27.2 or the bores integrated in these two elements, through the channel 29.2, the opening 30.2, the transverse channel 31.2, the transverse bore 19.2 and the axial bore 17.2, hose 9 to the inflatable article.

Figure 5:
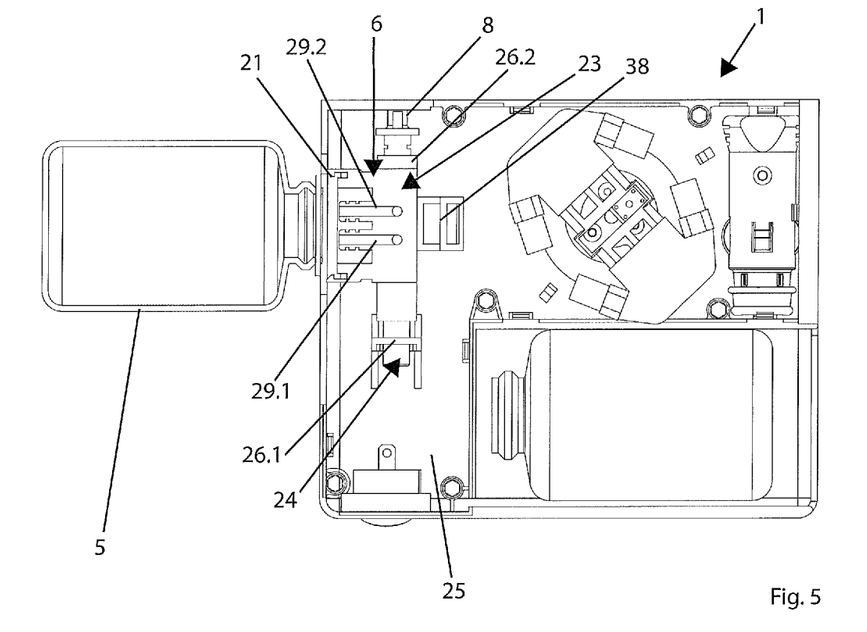
FIG. 5 is a perspective view illustrating the interior of a housing of an inventive device in a first position with a container fastened thereon in a horizontal position in accordance with embodiments of the invention.
Figure 6:
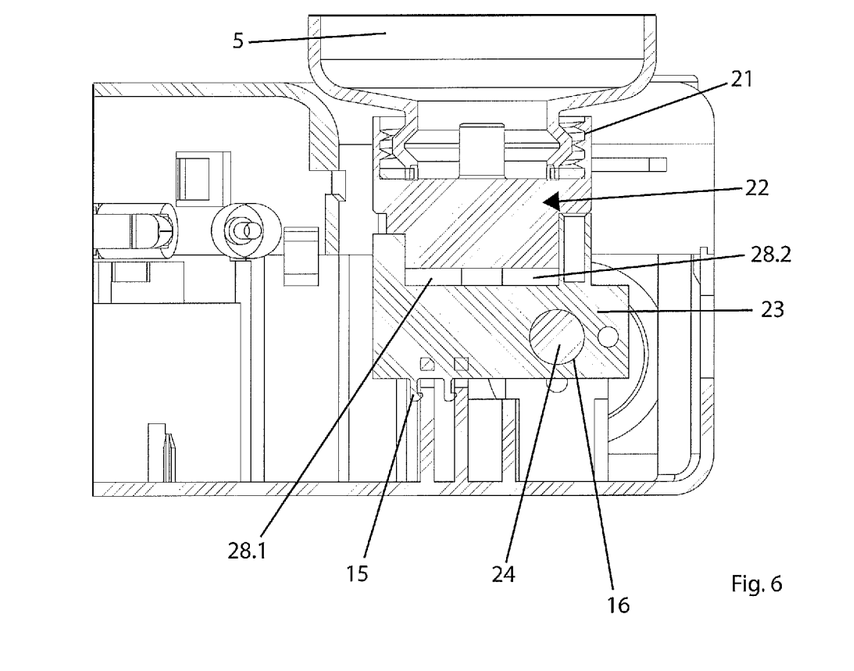
FIG. 6 is a perspective view illustrating two sleeve sections of a connecting head in accordance with embodiments of the invention.
Figure 7:
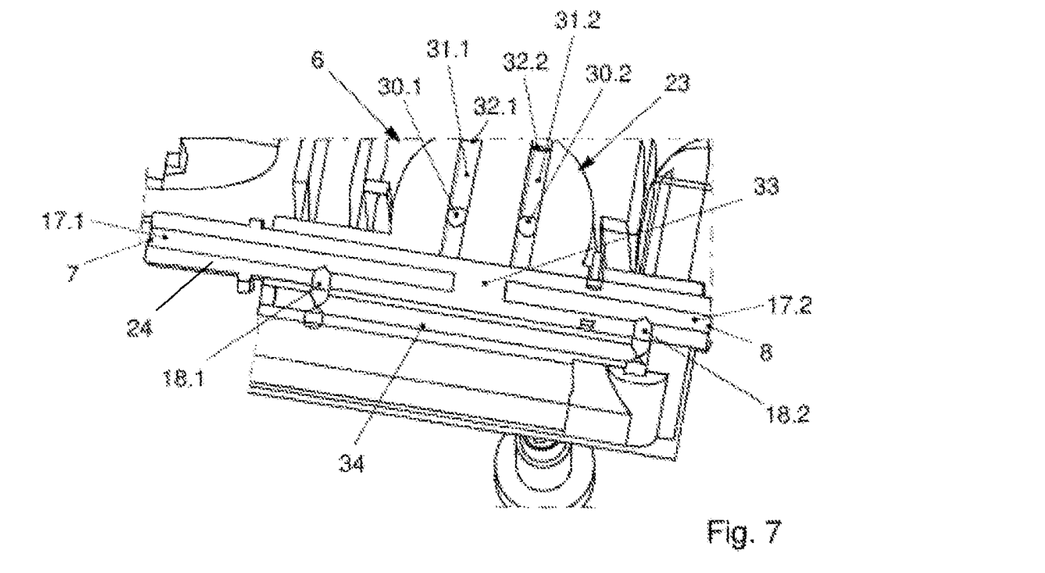
FIG. 7 is a perspective view illustrating two ducts in a receptacle connected to the interior of a container that open out into an opening into a transverse channel in the receptacle in accordance with embodiments of the invention.
Figure 8:
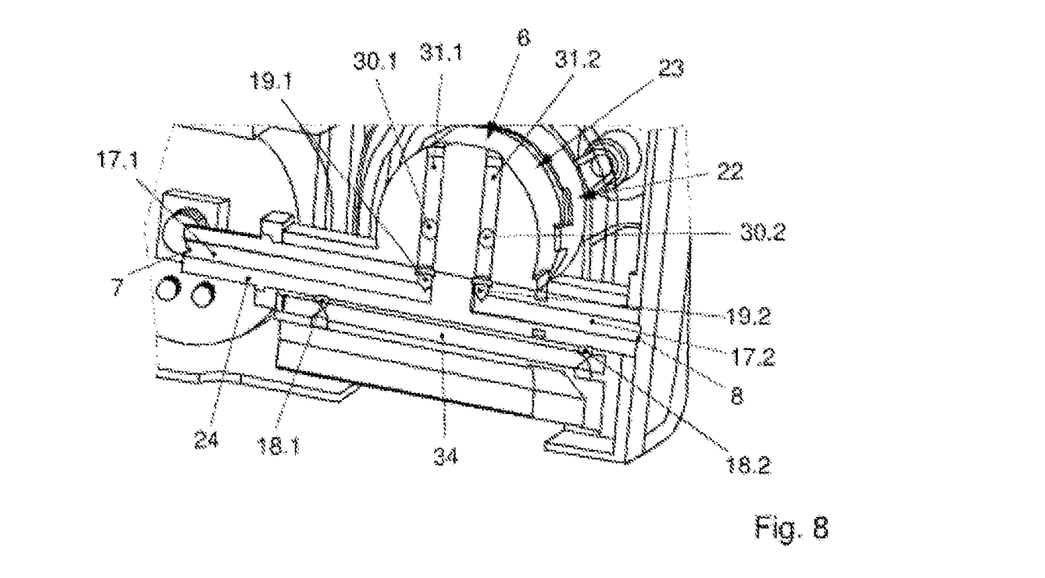
FIG. 8 is a perspective view illustrating a receptacle rotated about a shaft in accordance with embodiments of the invention.
Figure 9:
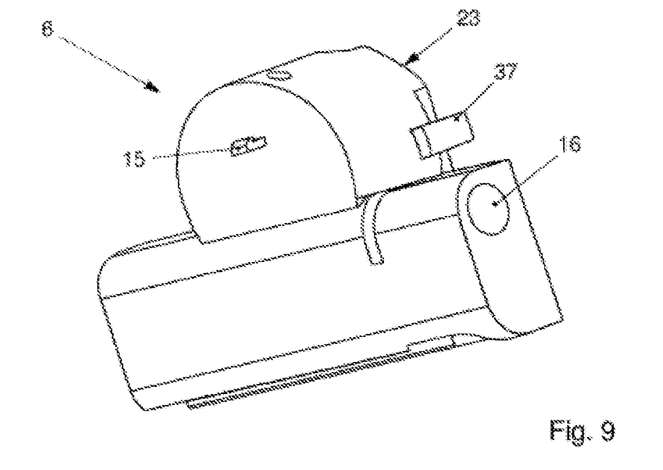
FIG. 9 is a perspective view illustrating a connection clip provided on the underside of a receptacle in accordance with embodiments of the invention.

In order to maintain the valve 6 in this second position, a further connection clip 15 is provided on the underside of the receptacle 23 (see FIG. 9), which in the second position of the valve 6, as shown in FIGS. 5 and 6.

REFERENCE LIST

1 Housing
2 Cover
3 Directional Arrow
4 Manometer
5 Containers
6 Valve
7 Inlet
8 Outlet
9 Connection Duct/Hose
10 Rotary Sleeve
11 Nipples
12 Clip Connector
13 Opening
14 Slot
15 Connection Clips
16 Channel
17 Axial Bore
18 Crossbore
19 Cross Hole
20 Sealing Rings
21 Thread
22 Connection Head
23 Recording
24 Wave
25 Floor
26 Bearing Block
27 Connection Head
28 Sleeve Section
29 Channel
30 Opening
31 Transverse Passage
32 Plugs
33 Center Piece
34 Bypass Channel
35 Centering Lug
36 Positioning device
37 Clip connection
38 Bracket
V Device

The invention claimed is:
1. A device for dispensing a sealant into an inflatable object from a container, the device having a valve that has an inlet (7) and an outlet (8), the valve inlet (7) configured to be connected to a compressed air source, and a connecting line (9) for connecting to the inflatable object connectable the outlet (8), wherein in a first position of the valve (6), the inlet (7) and the outlet (8) are connected to one another, and in second position of the valve (6) a connection is established between the inlet (7) and the container (5) and between the container (5) and the outlet (8), wherein the valve (6) has a receptacle (23) for releasably fixing the container (5), the container (5) is releasably fixed to the receptacle (23) by connection to a separate connecting head (22) that is configured to fix to the receptacle (23) using a pair of clip connectors (37) on the receptacle (23), wherein the valve (6) has a shaft (24) about which a switching element is rotatably arranged with the receptacle (23) for switching between the first position of the valve (6) and the second position of the valve (6) by movement of the container (5) from a horizontal position to a vertical position, and wherein the receptacle (23) for the container is arranged on the switching element.

2. The device according to claim 1, wherein the container (5) incorporates a clip connection (37) with the receptacle.

3. The device according to claim 1, wherein the receptacle (23) and the connecting head (22) each have at least two connections by connecting heads (27.1, 27.2) and sleeve sections (28.1, 28.2) which are configured to be brought into congruence with one another.

4. The device according to claim 1 wherein a first axial bore (17.1) and a second axial bore (17.2) are at least partially penetrated through the shaft (24), the first axial bore (17.1) being arranged in the second position of the valve (6) for passing air into the container (5) and the second axial bore (17.2) for passing sealant out of the container (5).

5. The device as claimed in claim 1, wherein the valve (6) is secured in its second position by a clip connection (37).

6. The device as claimed in claim 1, wherein the container (5) and the valve (6) are located in a housing (1).

7. The device according to claim 6, wherein the shaft (24) of the valve (6) is fixed in the housing (1).

8. The device as claimed in claim 6, wherein the valve (6) and the container (5) are each covered by a removable cover (2.1, 2.2), respectively.

9. The device according to claim 6, wherein at least the connecting line (9) between the valve (6) and the inflatable object is connected to the housing (1) by a clip connection (14.1, 12.1, 14.2, 12.2).

10. A method for dispensing sealant into an inflatable object from a container (5) using the device of claim 1, the method comprising:
  connecting a first end of the connecting line (9) to the outlet (8) of the valve (6);
  connecting a second end of the connecting line (9) to the inflatable object;
  connecting the container (5) to the receptacle (23) of the valve (6) when the valve (6) is in the first position such that the container (5) is in a horizontal position; and
  bringing the valve (6) into the second position by rotating the container (5) to an upside down position;
  wherein when the valve (6) is in the first position, only compressed air is supplied from the compressed air source to the inflatable object via the inlet (7), the outlet (8), and the connecting line (9); and
  wherein when the valve (6) is in the second position, compressed air is supplied from the compressed air source to the container (5) via the inlet (7) and compressed air sealant is then supplied to the inflatable object from the container (5) via the outlet (8) and the connecting line (9).

11. The method as claimed in claim 10, wherein the receptacle (23) receives and positions the container (5) using a clip connection (37).

12. The method according to claim 10, wherein the container (5) and the valve (6) are accommodated separately from one another in a housing (1).

13. The method as claimed in claim 12 wherein the valve (6) and the container (5) are each covered in the housing (1) by a separate removable cover (2.1, 2.2), respectively.

* * * * *